United States Patent
Lefebvre et al.

(10) Patent No.: US 10,078,373 B2
(45) Date of Patent: Sep. 18, 2018

(54) METHOD OF TEMPORAL SEGMENTATION OF AN INSTRUMENTED GESTURE, ASSOCIATED DEVICE AND TERMINAL

(71) Applicant: Orange, Paris (FR)

(72) Inventors: Gregoire Lefebvre, Crolles (FR); Sebastien Roux, Grenoble (FR); Eric Petit, Saint-Martin-d'Heres (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/182,057

(22) Filed: Feb. 17, 2014

(65) Prior Publication Data

US 2014/0232642 A1  Aug. 21, 2014

(30) Foreign Application Priority Data

Feb. 15, 2013 (FR) .................................... 13 51320

(51) Int. Cl.
*G06F 3/01* (2006.01)
*G06F 1/16* (2006.01)
(Continued)

(52) U.S. Cl.
CPC ............ *G06F 3/017* (2013.01); *G06F 1/1694* (2013.01); *G06F 3/038* (2013.01); *G06F 3/0346* (2013.01); *G06F 2200/1637* (2013.01)

(58) Field of Classification Search
None
See application file for complete search history.

(56) References Cited

U.S. PATENT DOCUMENTS 8,413,077 B2 *  4/2013  Yamamoto et al. .......... 715/863
8,892,390 B2 * 11/2014  MacGougan ......... G06F 3/0346
                                              702/141

(Continued)

FOREIGN PATENT DOCUMENTS

DE          10242890 A1      3/2004

OTHER PUBLICATIONS

French Search Report and Written Opinion dated Oct. 14, 2013 for corresponding French Patent Application No. 1351320, filed Feb. 15, 2013.

(Continued)

*Primary Examiner* — Nicholas J Lee
*Assistant Examiner* — Duane N Taylor, Jr.
(74) *Attorney, Agent, or Firm* — David D. Brush; Westman, Champlin & Koehler, P.A.

(57) ABSTRACT

Temporally segmenting an instrumented gesture executed by a user with a terminal having an inertial navigation module, which measures a vector of inertial characteristics representative of movement of the terminal. Segmenting includes, at each current instant: calculating an instantaneous power value of the vector; estimating a gesture indicator based on variation between the instantaneous power value and a mean power value estimated over a preceding time window; determining a start of gesture at a first instant, when the estimated gesture indicator is greater than or equal to a first threshold during a time interval greater than or equal to a first interval; and determining an end of gesture at a second instant when, at the current instant, the estimated gesture indicator is less than or equal to a second threshold during a time interval greater than or equal to a second time interval.

10 Claims, 5 Drawing Sheets

(51) Int. Cl.
 *G06F 3/038* (2013.01)
 *G06F 3/0346* (2013.01)

(56) References Cited

U.S. PATENT DOCUMENTS

| | | |
|---|---|---|
| 2007/0113207 A1 | 5/2007 | Gritton |
| 2008/0174550 A1* | 7/2008 | Laurila .................. A63F 13/02 |
| | | 345/158 |
| 2009/0231295 A1* | 9/2009 | Petit et al. .................... 345/173 |
| 2012/0016641 A1* | 1/2012 | Raffa .................. G06F 1/1694 |
| | | 703/2 |

OTHER PUBLICATIONS

English translation of the French Written Opinion dated Oct. 14, 2013 for corresponding French Patent Application No. 1351320, filed Feb. 15, 2013.

\* cited by examiner

METHOD OF TEMPORAL SEGMENTATION OF AN INSTRUMENTED GESTURE, ASSOCIATED DEVICE AND TERMINAL

1. FIELD OF THE INVENTION

The field of the invention is that of gestural interactions, and more particularly the temporal segmentation of an instrumented gesture formed in space by the trajectory of the hand of a user carrying a terminal.

2. PRESENTATION OF THE PRIOR ART

In recent years we have witnessed an explosion in uses around so-called "natural" interactions. The user can thus drive his terminal or a remote station with everyday gestures so as to gain access simply and rapidly to information or to a service. These gestures can be executed in 2D as drawings on a touchscreen, which are interpreted as a command for the system, or else executed in 3D, carried out in the air such as a gestural shortcut for activating a functionality. Gestures in 3D can be interpreted by the capture of the movement of his hand-held mobile terminal by virtue of inertial sensors (accelerometer, gyrometer, magnetometer). It is then appropriate to differentiate what is a gesture, in the capture of the movement of the mobile terminal, from what is not a gesture as such. Indeed, when the terminal is in the user's hand, he performs movements continuously with the latter, often movements of small amplitudes which are not instrumented gestures as such, but are nonetheless captured by the onboard accelerometer, gyrometer and magnetometer.

For example an application for creating "accelerometer" based instrumented gestures, developed by the company Probayes, is known. The user must input 3 instances of 3D gestures, allocate a name to this reference set, and then define the action to be executed during the segmentation of this gesture. The determination of the useful portion of the gesture to be recognized is done by pressing a button of the tactile interface, signifying the start of the gesture, and the end of gesture occurs as soon as the button is released.

3. DRAWBACKS OF THE PRIOR ART

A drawback of this technique is that it requires that a button be pressed during the execution of the gesture. This constraint is particularly annoying, since if the user wishes to access a service of his terminal rapidly through a gesture in the air, he does not wish to have a high visual load, necessary for locating the button and then pressing this interaction zone. Moreover, this continuous pressing of the button throughout the duration of the gesture constrains the user in his body movements, because he must keep a finger glued to the interface. Repeated too often, this situation would even run the risk of causing the user musculo-skeletal disorders. Additionally, this pressing is a source of error since the user may remove his finger too early and only the signal part segmented by the period of pressing on the button will be analyzed in respect of recognition, and this will culminate in confusion in the gestures or rejections as invalid gestures.

4. DESCRIPTION OF THE INVENTION

The invention improves the situation with the aid of a method of temporal segmentation of an instrumented gesture in the course of execution by a user with the aid of a terminal equipped with an inertial navigation module, able to measure, during the execution of the gesture, a vector of inertial characteristics representative of a movement of said terminal. Such a method is particular in that it comprises the following steps, implemented at each current instant:

calculation of an instantaneous power value of said vector at the current instant;

estimation of a gesture indicator on the basis of a variation between said instantaneous power value and a mean power value estimated over a time window preceding the current instant;

determination of a first instant, termed start of gesture, corresponding to the current instant, when the estimated gesture indicator takes a value greater than or equal to a first predetermined threshold during a time interval greater than or equal to a first predetermined time interval;

subsequent to the detection of a start of gesture at the first current instant, determination of a second instant, termed end of gesture when, at the current instant, the estimated gesture indicator takes a value less than or equal to a second predetermined threshold during a time interval greater than or equal to a second predetermined time interval.

With the invention, the user no longer has to specify the instants of start and of end of instrumented gesture to his terminal, for example by keeping a key of the interface pressed during the execution of the gesture.

On the contrary, the invention proposes an automatic temporal segmentation based on an estimation on the fly of a gesture indicator on the basis of the values of instantaneous powers of these inertial characteristics calculated over an observation time window and on a comparison of this estimated indicator with a first threshold representative of a start of gesture, and then, subsequent to the detection of a start of gesture, with a second threshold representative of an end of gesture.

Thus, the invention relies on an entirely new and inventive approach to the temporal segmentation of an instrumented gesture, which utilizes an estimation of a variation in the energy produced by the execution of the gesture over time to precisely determine the start and end instants thereof.

The invention thus makes it possible to free the user from the constraint of keeping a key of the user interface of his terminal pressed during the execution of an instrumented gesture with the aid of his terminal.

According to a first aspect of the invention, the method of temporal segmentation comprises a step of positive decision of temporal segmentation of a gesture, when the first and the second current instants are separated by a time interval greater than a third predetermined threshold.

It is therefore considered that an instrumented gesture is segmented if it is of sufficient duration. This makes it possible to reject false alarms.

According to a second aspect, the step of estimating a gesture indicator comprises the estimation of a first estimator of mean power of the instantaneous powers over said window, said instantaneous powers being weighted according to a first weighting, the estimation of a second estimator of mean power of the instantaneous powers over said window, said instantaneous powers being weighted according to a second weighting and the calculation of the gesture indicator as a function of the absolute value of the difference between the estimated values of the first and of the second estimator.

An advantage of resorting to two estimators is that this allows the mean energy received by the navigation module of the terminal to be estimated in two different ways, by giving more or less weight to the current value and to the history.

Advantageously, the second weighting applies a higher weight to the instantaneous power value calculated at the current instant than the first weighting.

Thus the first estimator has a long memory and gives more weight to the past power values, while the second estimator favors the new instantaneous power value. The absolute value of the difference between the two estimators highlights the significant energy variations received over time, which are representative of a gesture in the course of execution.

According to another aspect of the invention, the first and the second estimator are calculated in a recursive manner on the basis of the value estimated at the previous instant and of the instantaneous power value calculated at the current instant.

An advantage is that whatever the size of the time window considered, it is necessary to store in memory only the values of the first and second power estimators at the preceding instant $t_n-1$ and at the current instant. The method of temporal segmentation according to this aspect of the invention is therefore very economical in terms of storage memory.

According to another aspect of the invention, the method of temporal segmentation comprises a step of initializing the step of estimating the gesture indicator, at an initial instant whose value belongs to the group comprising:

An instant of power-up of the terminal equipment;
An instant of launching of a predetermined application;
The current instant decreased by a predetermined time-window size.

The gesture indicator provides a time-smoothed mean value of the variation of energy liberated by the execution of an instrumented gesture. The size of the time window $F[t_0, t_n]$ used for the estimation of the mean power must be sufficient to avoid false segmentations due to spurious movements of the terminal. The larger the window considered, the more robust the method is to small unintentional movements due to a conventional manipulation of the terminal.

According to yet another aspect, subsequent to the determination of a second instant of end of gesture, it triggers a validation step comprising the following sub-steps of:

calculation of a measure of inertial variation between the instantaneous values of the vector of inertial characteristics at the current instant and of the estimated mean values of said characteristics over a time window preceding the current instant;
comparison of the calculated variation value with a predetermined threshold during a predetermined time interval;
validation of the instant of end of gesture determined when the calculated measure M is less than said threshold at least during the predetermined time interval DM.

This extra step validates or rejects the instant of end of gesture determined, by taking into account a measure of variation of the real value of the inertial characteristics carried out component by component. It supplements the energy analysis carried out on the basis of the estimation of mean power of the vector of inertial characteristics. An advantage is that it makes it possible to avoid over-segmentations due to temporary drops in the energy received by the inertial navigation module, during the execution of the gesture, on account of a slowdown in the movement produced by the user.

The method of temporal segmentation which has just been described in its various embodiments can be implemented by a device for temporal segmentation of an instrumented gesture in the course of execution by a user with the aid of a terminal equipped with an inertial navigation module, able to measure, during the execution of the gesture, a vector of inertial characteristics representative of a movement of said terminal.

Such a device is particular in that it is able to implement the following modules:

calculation (PI) of an instantaneous power value of said vector ($\vec{V}(t_n)$) at the current instant;
estimation (CALC I) of a gesture indicator ($I(t_n)$) on the basis of a variation between said instantaneous power value and a mean power value estimated over a time window ($F(t_0, t_n)$) preceding the current instant;
determination (DET $t_{n1}$) of a first instant ($t_{n1}$), termed start of gesture, corresponding to the current instant, when the estimated gesture indicator takes a value greater than or equal to a first predetermined threshold (SD) during a time interval greater than or equal to a first predetermined interval (DD);
subsequent to the detection of a start of gesture at the first current instant ($t_{n1}$), determination (DET $t_{n2}$) of a second instant ($t_{n2}$), termed end of gesture when, at the current instant, the estimated gesture indicator takes a value less than or equal to a second predetermined threshold (SF) during a time interval greater than or equal to a second predetermined time interval (DF).

The invention also relates to a terminal equipment), equipped with an inertial navigation module able to measure, during the execution of a gesture, a vector of inertial characteristics representative of a movement of said terminal, and comprising the temporal segmentation device which has just been described.

The invention further relates to a computer program comprising instructions for the implementation of the steps of a method of temporal segmentation such as described previously, when this program is executed by a processor. Such a program can use any programming language. It can be downloaded from a communication network and/or recorded on a medium readable by computer.

The invention finally pertains to a storage medium, readable by a processor, possibly integrated into the temporal segmentation device according to the invention, optionally removable, storing a computer program implementing a method of temporal segmentation such as described previously.

The recording media mentioned hereinabove can be any entity or device capable of storing the program and readable by a terminal equipment. For example, the media can comprise a storage means, such as a ROM, for example a CD ROM or a microelectronic circuit ROM, or else a magnetic recording means, for example a diskette (floppy disk) or a hard disk.

Moreover, the recording media can correspond to a transmissible medium such as an electrical or optical signal, which can be conveyed via an electrical or optical cable, by radio or by other means. The programs according to the invention can be in particular downloaded from a network of Internet type.

LIST OF FIGURES

Other advantages and characteristics of the invention will be more clearly apparent on reading the following description of a particular embodiment of the invention, given by way of simple illustrative and nonlimiting example, and the appended drawings, among which.

DESCRIPTION OF A PARTICULAR
EMBODIMENT OF THE INVENTION

The general principle of the invention relies on the automatic temporal segmentation of an instrumented gesture executed by a user with the aid of his terminal. This temporal segmentation relies on the continuous analysis of a variation in the energy contained in the inertial characteristics signals sensed by the inertial navigation module of the terminal.

A few examples of instrumented gestures executed by a user of a terminal equipment ET are presented in conjunction with FIG. 1. In the subsequent description, it will be considered that this equipment is a mobile terminal of "intelligent terminal" ("smartphone") type. However, the invention is not limited to this type of terminal, but relates to any terminal equipment equipped with an inertial navigation module, such as for example a remote control, a games console or else a tablet.

The gestures illustrated by the examples of FIG. 1 are symbolic gestures, that is to say which represent a symbol. Such gestures are made in the form of movements described in 3D space by the trajectory of the hand of the user carrying the terminal. These symbols may be digits, letters of the alphabet, semantic shapes for example of heart, square, triangle type, an infinity sign, in conjunction with FIG. 1A, shakes in conjunction with FIG. 1B, continuous clockwise rotations, in conjunction with FIG. 1C, or anti-clockwise rotations, flips of the terminal in conjunction with FIG. 1D or else rectilinear gestures in a particular direction (for example, "right flick").

Of course, other symbolic gestures may be executed.

It will be noted that the invention which will be described hereinbelow in a more detailed manner, can be implemented by means of software and/or hardware components. In this regard, the terms "module" and "entity", used in this document, may correspond either to a software component, or to a hardware component, or else to a set of hardware and/or software components able to implement the function or functions described for the module or the entity concerned.

Figure 2:
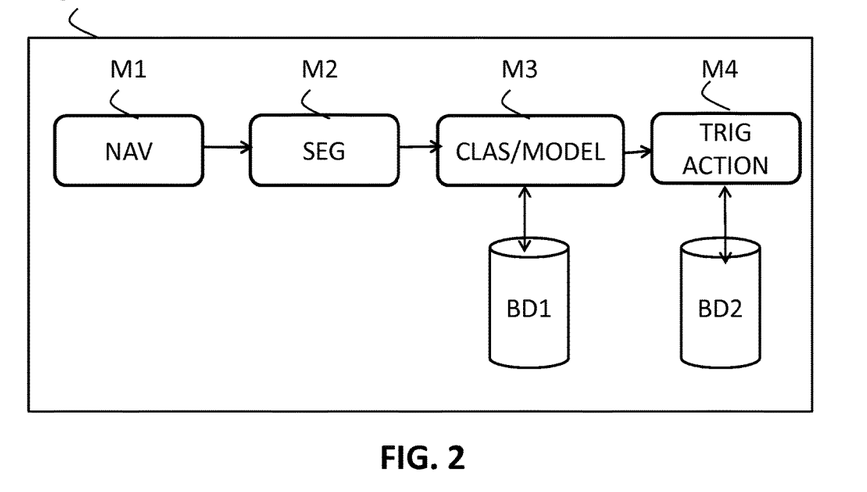
FIG. 2 presents in a schematic manner the functional elements of a system for processing an instrumented gesture implementing the invention.

The functional elements of a system S for processing an instrumented gesture implementing the principles of the invention are presented in conjunction with FIG. 2. Such a system comprises an inertial navigation module M1 able to produce at a succession of temporal instants a vector of inertial characteristics $\vec{V}(t_n)$, a module for temporal segmentation of an instrumented gesture M2 according to the invention, able to provide a temporal segmentation of the gesture comprising a first instant $t_{n1}$ of start of gesture and a second instant $t_{n2}$ of end of gesture, a classification/modeling module M3, able to assign to the segmented gesture a class from among a set of predetermined classes of reference gestures or else, in the case of a gesture creation, to model the class of the gesture created, said classes being stored in a first database BD1 and of a module M4 for associating a predetermined command action with the gesture class assigned with the aid of a second database BD2 comprising a plurality of associations of class of gesture/action and of triggering of the associated action. For example, the associated action can be the launching of an application or the placing of the terminal on standby or else the requesting of synchronization with a remote service.

Figure 3:
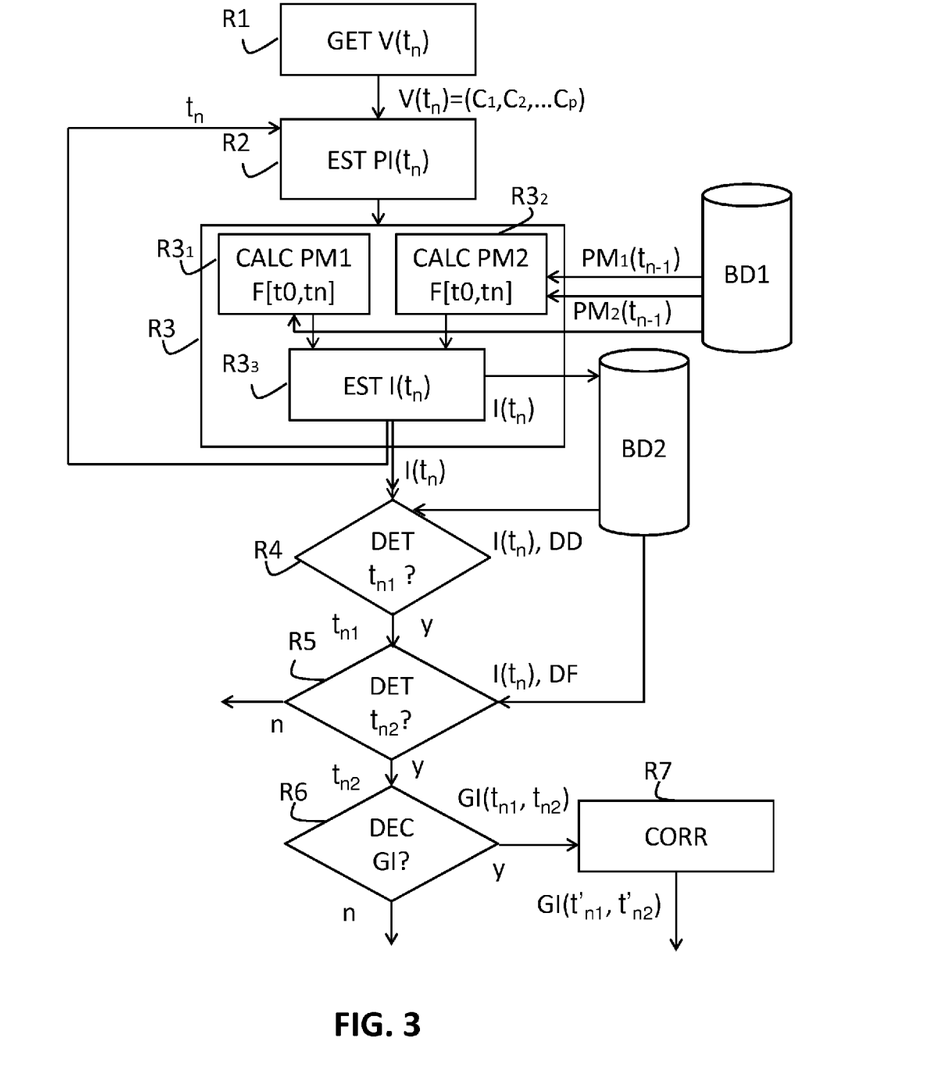
FIG. 3 presents in a schematic manner the steps of a method of temporal segmentation of an instrumented gesture according to a first embodiment of the invention.

The steps of the method of temporal segmentation of an instrumented gesture according to a first embodiment of the invention are now presented in conjunction with FIG. 3. Such a method makes it possible in particular to carry out the function of the temporal segmentation module M2 which has just been presented.

In the course of a first step R1, a vector of inertial characteristics $\vec{V}(t_n)=(c_1, \ldots, c_p)$, with p an integer greater than or equal to 2, is obtained at the instant $t_n$, with n a non-zero integer, of the inertial navigation module NAV of the terminal ET. Such a vector is representative of the inertial movement signal sensed by all the sensors of the inertial navigation module.

Figure 1A:
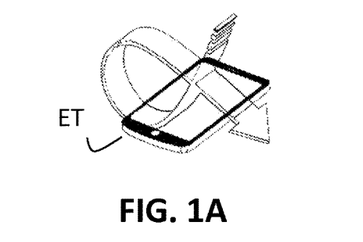
FIGS. 1A, 1B, 1C and 1D present examples of instrumented symbolic gestures.
Figure 1B:
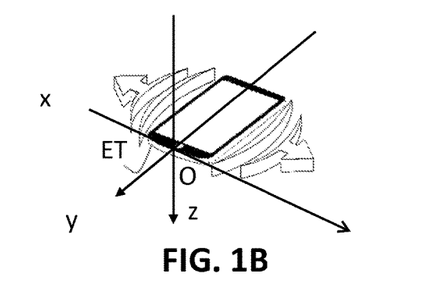
Figure 1C:
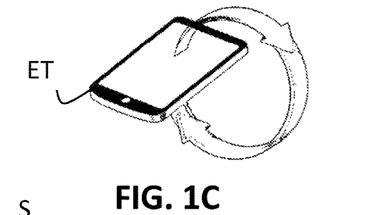
Figure 1D:
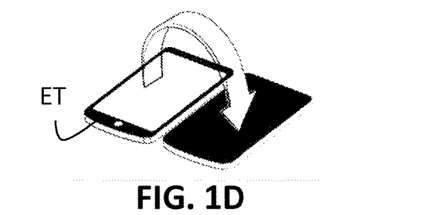

It is considered for example that this module comprises an accelerometer sub-module able to measure an acceleration at the instant $t_n$ on the three axes of a reference frame Ref (O, x, y, z) of the terminal ET, such as that represented in conjunction with FIG. 1B, a gyrometer able to measure an angular velocity at the instant $t_n$ on the three axes of the reference frame Ref and a magnetometer able to measure the terrestrial magnetic field on the three axes of the reference frame Ref. In this example, the vector of inertial characteristics therefore comprises 9 components.

A new vector of characteristics $\vec{V(t_n)}$ is acquired at regular intervals, for example every 20 ms by the inertial navigation module and transmitted to the temporal segmentation module M2.

In the course of a step R2, an instantaneous power $P(t_n)$ of the vector of characteristics $\vec{V}$ is calculated at the instant $t_n$, in the following manner:

$$P(t_n) = 0.5 \cdot \sqrt{\sum_{i=1}^{p} c_i^2} \qquad (1)$$

Such instantaneous power represents an energy received by the various sensors of the navigation module, at the instant $t_n$, on account of the movement of the terminal ET.

The function of step R3 is to estimate the value of an instrumented gesture indicator I at the instant $t_n$. In this first embodiment of the invention, it comprises three sub-steps:

In $R3_1$, a first power estimator $E_0$ is calculated, defined by the following recursive formula:

$$E_0(t_n)=\beta_0 E_0(t_{n-1})+(1-\beta_0)P(t_n) \qquad (2),$$

with $\beta_0$ non-zero real weighting factor, of absolute value less than 1.

In $R3_2$, a second power estimator $E_1$ is calculated, defined by the following recursive function:

$$E_1(t_n)=\beta_1 E_1(t_{n-1})+(1-\beta_1)P(t_n) \quad (3)$$

With $\beta_1$ non-zero real weighting factor of absolute value less than 1.

In $R3_3$, a useful gesture indicator I is calculated, defined by:

$$I=|E_0(t_n)-E_1(t_n)| \quad (4)$$

The gesture indicator calculated according to the invention results from a difference between the values of these two power estimators E0 and E1 at the instant $t_n$.

It expresses a smoothed evolution of the quantity of energy sensed by the inertial navigation module at each instant $t_n$ with respect to a mean quantity of energy measured in the past.

It is understood that, according to the values chosen for the weighting factors, the first and the second estimators will each calculate a mean power which gives more or less weight to the new instantaneous power value calculated at the instant $t_n$.

In an exemplary implementation, the weighting values are chosen as follows:

$$\beta_0=0.98 \text{ and } \beta_1=0.67.$$

The first estimator E0 therefore gives very little weight to the new instantaneous power value, but a great deal to the past values. This is a long-memory estimator. It follows from this that the mean power estimated for the gesture in the course of execution by this first estimator is impacted very little by the new value.

On the contrary, the second estimator E1 resorts to more balanced weighting values, so that it gives more weight to the new instantaneous power value received for the instant $t_n$.

Thus, when an instrumented gesture begins to be executed, the instantaneous power value at the current instant becomes high, and this will express itself through an increase in the value of the second estimator E1. On the other hand, if the power value does not continue to increase in the course of the following instants, this instantaneous power spike will be incorporated into the first estimator E0 and lead either to stagnation of the value of the indicator I (if the sensed movement retains a roughly constant energy), or to a drop in its value (if the sensed movement loses energy).

The initial instant $t_0$ from which the power estimators begin to be calculated can be chosen in various ways, the significant thing being that the time window preceding the current instant $t_n$ be sufficiently large to constitute a representative history:

The instant $t_0$ may be that at which the terminal is turned on;

The instant $t_0$ may be chosen equal to the instant of launching of a particular application implementing the module M2 for temporal segmentation of a gesture;

The instant $t_0$ may be determined in a sliding manner, in such a way that the time window considered is equal to a predetermined duration, for example of 1 second or 500 ms.

In R4, an instant $t_{n1}$ of start of gesture is determined on the basis of the indicator I according to the following criteria:

the estimation of the start of gesture is active when this indicator I exceeds a given threshold SD;

to be considered a valid gesture, the signal must remain above this threshold for the minimum duration DD;

If an instant $t_{n1}$ of start of gesture has been determined, an instant $t_{n2}$ of end of gesture is determined in R5 as a function of the following criteria:

there is an end of gesture when the signal falls back under the threshold SF, during a predetermined time interval DF. This thus entails avoiding breaking off a gesture comprising points of zero acceleration, although it has not finished.

If an instant $t_2$ of end of gesture has been decided, a decision relating to the segmentation of an instrumented gesture is taken in R6, at least as a function of the following criterion:

the useful signal must be of a minimum duration D_min.

In an advantageous manner, a correction is applied in R7 to the instant of start and of end of gesture, in the following manner:

the span of the gesture then corresponds to the signal between the detected instants of start and of end, by adding a signal portion upstream DDC and by removing same downstream DFC (the indicator being smoothed, it is slightly shifted over time);

In an exemplary implementation in respect of the accelerometric sensor, the following minimum values of thresholds and of duration have been chosen: SD=280 $g^2$, SF=230 $g^2$, DD=8 ms, DF=10 ms, D_min=400 ms, DDC=5 ms, DFC=5 ms.

Figure 4:
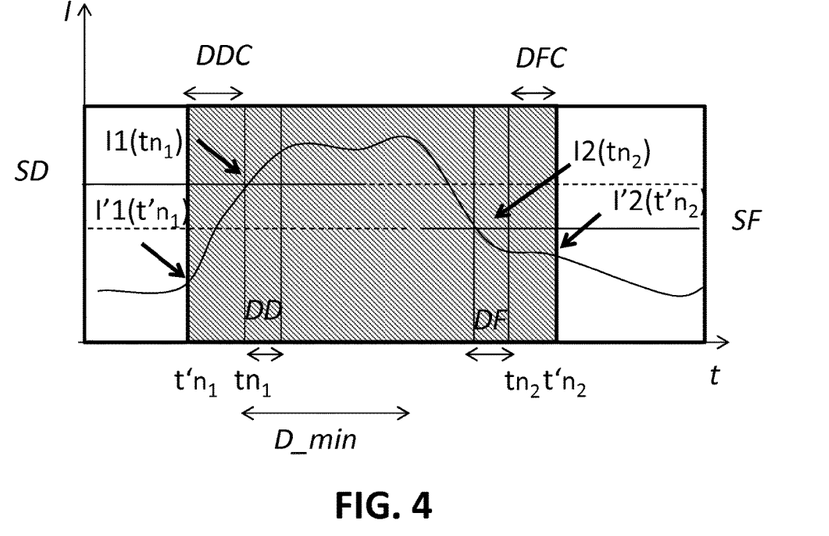
FIG. 4 presents a first exemplary curve of evolution over time of the gesture indicator estimated according to a first embodiment of the invention.

Now presented in conjunction with FIG. 4 is an evolution curve for the gesture indicator I, the calculation of which has just been detailed, as a function of time, during the execution of a gesture.

This curve shows that the indicator I has, in the absence of instrumented gesture production, a low, roughly constant, value. Its value increases thereafter with a steep slope and exceeds the start-of-gesture threshold SD, the instant $t_1$. The value of the indicator I continues to increase rapidly for the period of duration DD, on completion of which a start-of-gesture decision at the point $I1(t_1)$ is confirmed. Next the value of the indicator I attains a maximum. The curve begins to decrease with a steep slope and crosses the threshold SF at the instant $t_2$. It will be noted that this end threshold a value less than the start threshold SD. The curve continues to descend steeply until the end of the period DF, on completion of which the point $I2(t_2)$ is determined as the end-of-gesture point.

This figure also shows that, for this curve, the duration $tn_2-tn_1$ is much greater than the minimum time interval D_min predetermined such that an instrumented gesture is considered to be recognized.

Finally, according to an aspect of the invention, a step R7 of correcting the instant of start of gesture $t_{n1}$ and the instant $t_{n2}$ of start of gesture is introduced, to offset the fact that the gesture indicator I is obtained on the basis of information regarding powers smoothed over a time window $F[t_0, t_n]$ and thus gives time-shifted information. It is therefore supplemented with an additional time sequence DDC at the start, this amounting to placing the start of gesture at the instant $t'n_1=tn_1-DDC$ and it is supplemented with an additional time sequence at the end, which amounts to placing the instant of end of gesture at $t'n_2=tn_2+DFC$. The temporally segmented gesture $GI(t'_{n1}, t'_{t2})$ corresponds to the hatched curve zone of the curve.

Figure 5:
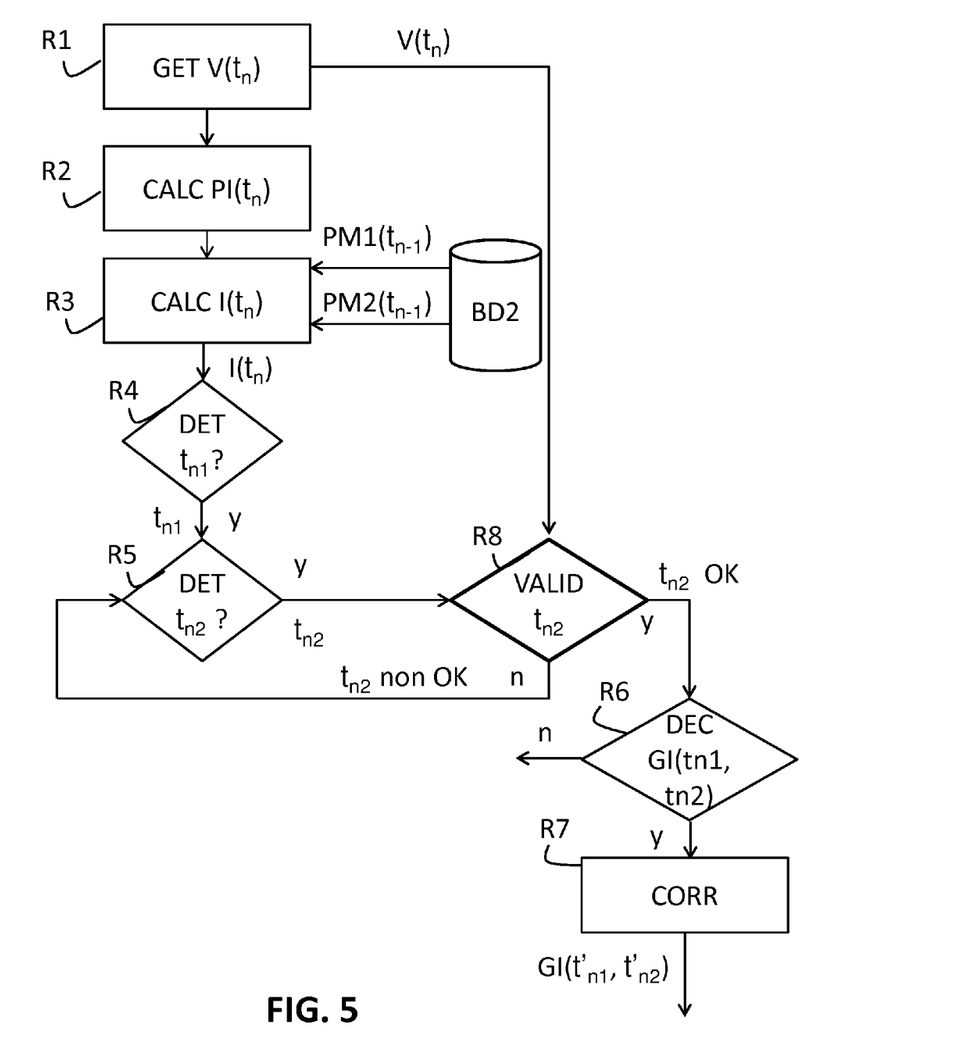
FIG. 5 presents in a schematic manner the steps of a method of temporal segmentation of an instrumented gesture according to a second embodiment of the invention.

The steps of the method of temporal segmentation of an instrumented gesture according to a second embodiment of the invention are now presented in conjunction with FIG. 5.

According to this second embodiment, steps R1 to R7 are identical to those described in conjunction with FIG. 3.

The method furthermore comprises, subsequent to the determination of an instant of end of gesture by step R5, a step R8 of validating the instant $t_{n2}$ of end of gesture thus determined. Such a step relies on the calculation of a measure M of variation between the instantaneous and estimated values of inertial characteristics on each component i, with i an integer lying between 1 and p, of the vector of characteristics $\overrightarrow{V(tn)}$ in the following manner:

$$M(t_n) = \sum_{i=1}^{p} 0.5|EV_i(t_n) - c_i(t_n)| \quad (5)$$

with $t_n=(c_1, \ldots c_p)$ and $\rho$ values of a sensor at the instant $t_n$ and $EV_i(t_n)=\beta_i E_i(t_{n-1})+(1-\beta_i)c_i(t_n)$ an estimator of the inertial value $c_i$ at the instant $t_n$ on the basis of the inertial values obtained at the previous instants over the time window F[t0, tn].

This estimator therefore sums the absolute values of the differences between estimated mean values and real values on each inertial component of the reference frame Ref.

The value of the measure M obtained is compared for a minimum duration DM with a threshold TM, fixed with the help of a base of annotated gestures. If the value of the measure M is greater than or equal to the threshold TM over the duration M, then the end-of-gesture decision is rejected if need be.

If the value of the measure M is less than the threshold TM over the duration DM, then the end-of-gesture decision is validated.

In an exemplary implementation in respect of the accelerometric sensor, we choose: DM=10 ms, TM=20 g, $\beta_i$=0.96.

The weighting coefficients $\beta_i$ being fixed at a very high value, a very large weight is given to the history, thereby enabling the impact of spot values of inertial characteristics $ci(t_n)$ that are slightly noisy to be put into perspective. As long as these spot values continue to increase in absolute value sufficiently, the measure M has a tendency to increase and it is considered that the gesture is still in the course of production, this running counter to the end-of-gesture decision taken in R5. Conversely, a decrease in the measure M with undershoot of the threshold TM for the duration DM validates the previously determined instant $t_{n2}$, as marking the end of the gesture.

This measure therefore makes it possible, by refining the decision obtained on the basis of the power estimators, to avoid over-segmentation, that is to say the fact of defining several start and end of gesture sequences for one and the same instrumented gesture. Indeed, this measure, by being based on the real values of inertial characteristics and not on the square of these values, does not evolve in the same manner as the gesture estimator depending on the inertial energy received by the inertial navigation module of the terminal. It is particularly relevant, when the inertial energy received decreases momentarily when producing a gesture, although without corresponding to the end of a gesture. The user does indeed tend to slow the speed of execution of his gesture at certain points of its trajectory. For example, he slows his gesture when producing a heart, at the level of the central curves, in particular because these shapes are trickier to execute. In this case, the information given by the measure M reveals a level of activity sufficient to eliminate the assumption of an end of gesture.

It will be noted that the advantage of this validation step is also to reduce the response latency time of the method of temporal segmentation according to the invention, that is to say the duration DF associated with the determination of an instant of end of gesture.

Indeed, the time interval DM being less than the interval DF, when the end of gesture is validated according to the measure M, the method of temporal segmentation terminates more earlier than when the end of gesture is validated by the indicator I.

Figure 6:
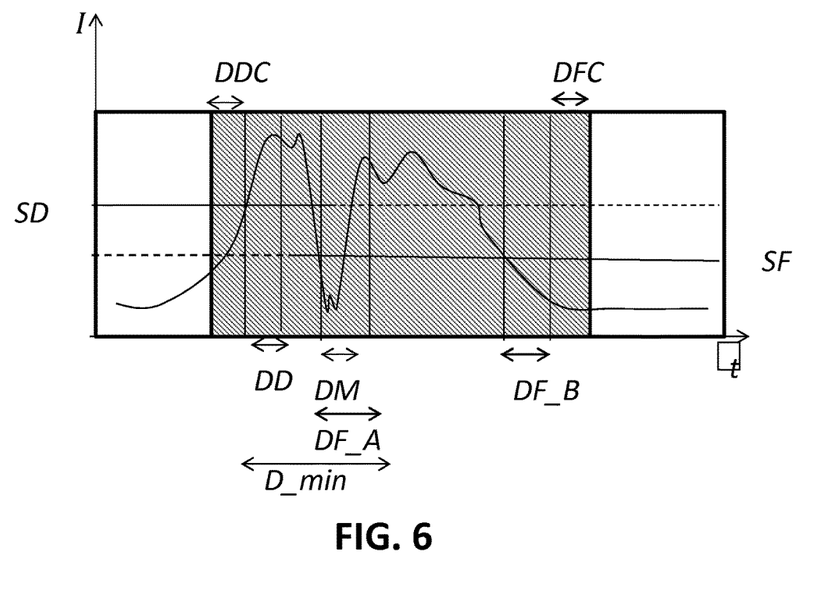
FIG. 6 presents a second exemplary curve of evolution over time of the gesture indicator estimated according to a second embodiment of the invention for a second exemplary instrumented gesture.

Presented in conjunction with FIG. 6 is an evolution curve for the gesture indicator I as a function of time, for a second exemplary gesture and according to the second embodiment, which has just been presented, of the invention. This second curve highlights two end-of-gestures spans DF_A and DF_B. The first DF_A is not validated by the validation step R7, therefore the segmentation continues until DF_B which is indeed validated and marks the end of the gesture.

Figure 7:
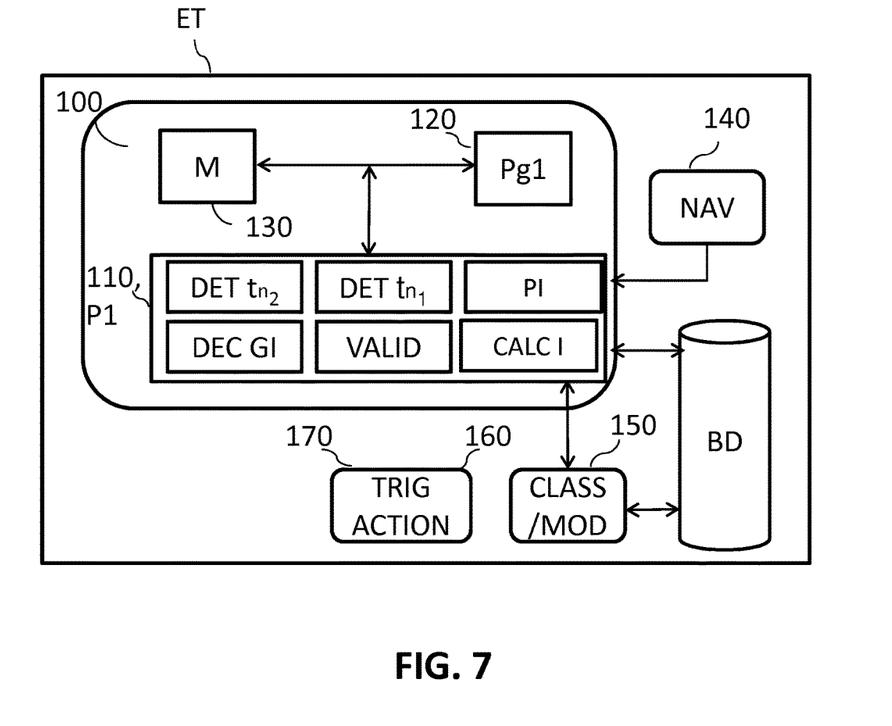
FIG. 7 describes an exemplary hardware structure of an instrumented gesture temporal segmentation device according to the invention.

The simplified structure of a device 100 for temporal segmentation of an instrumented gesture according to an exemplary embodiment of the invention is now considered in conjunction with FIG. 7. The temporal segmentation device 100 implements the method of temporal segmentation, as described hereinabove, according to the invention.

In this example, the device 100 is integrated into a terminal equipment ET of a user. According to a variant, the device 100 could be independent and connected to the terminal ET.

For example, the device 100 comprises a processing unit 110, equipped for example with a processor P1, and driven by a computer program $Pg_1$ 120, stored in a memory 130 and implementing the segmentation method according to the invention.

On initialization, the code instructions of the computer program $Pg_1$ 120 are for example loaded into a RAM memory before being executed by the processor of the processing unit 110. The processor of the processing unit 110 implements the steps of the previously described segmentation method, according to the instructions of the computer program 120. In the considered exemplary embodiment of the invention, the device 100 comprises at least a unit GET for obtaining a vector of inertial characteristics at an instant $t_n$, a unit PI for calculating an instantaneous power of said vector at the instant $t_n$, a unit CALC I for calculating a gesture indicator I on the basis of first and second mean powers estimated at the instant $t_n$, a unit DET $t_{n1}$ for determining an instant $t_{n1}$ of start of gesture and a unit DET $t_{n2}$ for determining an instant $t_{n2}$ of end of gesture and a unit DEC GI for deciding segmentation of an instrumented gesture GI. These units are driven by the processor P1 of the processing unit 110.

The temporal segmentation device 100 is therefore designed to cooperate with the terminal ET and in particular the following modules of this terminal: an inertial navigation module NAV able to measure a vector $\vec{V}$ of inertial characteristics at an instant $t_n$, a module CLAS/MOD for classifying a gesture G recognized by the device 100 according to the invention or for modeling a gesture created by the user of the terminal ET, a module TRIG ACTION for triggering an action associated with the classified or modeled gesture.

The invention which has just been presented can find numerous applications. In particular, it can be used to temporally segment an instrumented gesture so as to prepare its automatic classification by a classification module of the terminal.

Advantageously, it can also be implemented in a gesture creation application, which prompts the user to associate a gesture of his choice with a command action, such as the launching of an application. For example, the user draws an envelope each time he wishes to launch the messaging application. The user is generally allowed several tries to produce the instrumented gesture that he has chosen. An analysis/classification module characterizes it according to a technique known to the person skilled in the art, for example by training of continuous hidden Markov models, and stores in memory the characteristics obtained and the command action with which the user wishes to associate it. With the invention, the gesture produced by the user will benefit from a precise temporal segmentation before its analysis by the analysis/classification module.

Of course, other applications of the invention may be envisaged.

The invention claimed is:

1. A method comprising:
temporal segmentation of an instrumented gesture in the course of execution by a user by moving a hand held terminal in the air, wherein the terminal is equipped with an inertial navigation module having at least one sensor, and wherein said temporal segmentation comprises the following acts, implemented at each current instant ($t_n$) by a processor:
measuring, during the execution of the gesture, a vector of inertial characteristic values $\vec{V}$ representative of movement of said terminal in the air, using the at least one sensor;
calculation of an instantaneous power value ($P(t_n)$) of said vector ($\overset{u}{\vec{V}}(t_n)$) at the current instant, the instantaneous power value being a single value calculated as a function of the values of all of the inertial characteristic in the vector ($\overset{u}{\vec{V}}(t_n)$);
estimation of a gesture indicator ($I(t_n)$) on the basis of a variation between said instantaneous power value and a mean power value estimated over a time window ($F[t_0, t_n]$) preceding the current instant;
determination of a first instant ($t_{n1}$), termed start of gesture, corresponding to the current instant, further to the estimated gesture indicator taking a value greater than or equal to a first predetermined threshold during a time interval greater than or equal to a first predetermined interval; and
subsequent to the detection of a start of gesture at the first current instant ($t_{n1}$), determination of a second instant ($t_{n2}$), termed end of gesture further to, at the current instant, the estimated gesture indicator taking a value less than or equal to a second predetermined threshold during a time interval greater than or equal to a second predetermined time interval.

2. The method according to claim 1, wherein the method comprises a positive decision of segmentation of a gesture when the first and the second current instants ($t_{n1}$, $t_{n2}$) are separated by a time interval greater than a third predetermined threshold.

3. The method according to one of claim 1, wherein estimating a gesture indicator comprises estimation of a first estimator of mean power of the instantaneous powers over said window, said instantaneous powers being weighted according to a first weighting, estimation of a second estimator of mean power of the instantaneous powers over said window, said instantaneous powers being weighted according to a second weighting, and calculation of the gesture indicator as a function of the absolute value of the difference between the estimated values of the first and of the second estimator.

4. The method according to claim 3, wherein the second weighting applies a higher weight to the instantaneous power value calculated at the current instant ($t_n$) than the first weighting.

5. The method according to claim 3, wherein the first and the second estimators are calculated in a recursive manner on the basis of the value estimated at the previous instant ($t_n-1$) and of the instantaneous power value ($P(t_n)$) calculated at the current instant ($t_n$).

6. The method according to claim 1, wherein the method comprises initializing the act of estimating the gesture indicator, at an initial instant ($t_0$), whose value belongs to the group consisting of:
an instant of power-up of the terminal equipment;
an instant of launching of a predetermined application; and
the current instant ($t_n$) decreased by a predetermined time-window size.

7. The method according to claim 1, wherein subsequent to the determination of a second instant ($t_{n2}$) of end of gesture, the method triggers a validation act comprising the following sub-acts:
calculation of a measure of inertial variation between the instantaneous values of the vector of inertial characteristics at the current instant ($t_n$) and of the estimated mean values of said characteristics over a time window ($F[t_0, t_n]$) preceding the current instant;
comparison of the calculated variation value with a predetermined threshold during a predetermined time interval; and
validation of the instant ($t_{n2}$) of end of gesture determined when the calculated measure is less than said threshold at least during the predetermined time interval.

8. A device comprising:
a hand-held terminal comprising:
an inertial navigation module having at least one sensor to sense movement of the terminal;
memory storing instructions;
a processor, configured by the instructions to:
measure, during execution of an instrumented gesture made by a user moving the hand held terminal in the air, a vector ($\vec{V}(t_n)$) of inertial characteristic values representative of movement of the terminal, using the at least one sensor; and
temporally segment the instrumented gesture in the course of execution by the user, which comprises:
calculating an instantaneous power value of said vector ($\vec{V}(t_n)$) at a current instant where the instantaneous power value is a single value calculated as a function of the values of all of the inertial characteristics in the vector ($\vec{V}(t_n)$);
estimating a gesture indicator ($I(t_n)$) on the basis of a variation between said instantaneous power value and a mean power value estimated over a time window ($F(t_0, t_n)$) preceding the current instant;
determining a first instant ($t_{n1}$), termed start of gesture, corresponding to the current instant, further to the estimated gesture indicator taking a value greater than or equal to a first predetermined threshold during a time interval greater than or equal to a first predetermined interval; and subsequent to the detection of a start of gesture at the first current instant ($t_{n1}$), determining a second instant ($t_{n2}$), termed end of gesture further to, at the current instant, the estimated gesture indicator taking a value less than or equal to a second predetermined threshold during a time interval greater than or equal to a second predetermined time interval.

9. The device of claim 8, wherein the terminal is equipped with an inertial navigation module (NAV) stored in the memory and executable by the processor to measure, during the execution of a gesture, the vector ($\vec{V}(t_n)$) of the inertial characteristics representative of the movement of said terminal.

10. A non-transitory computer-readable medium comprising a computer program recorded thereon and comprising instructions for implementation of a method, when the instructions are executed by a processor, wherein the method comprises:

temporal segmentation of an instrumented gesture in the course of execution by a user by moving a hand held terminal in the air, wherein the terminal is equipped with an inertial navigation module having at least one sensor, and wherein temporal segmentation comprises the following acts, implemented at each current instant ($t_n$):

measuring, during the execution of the gesture, a vector of inertial characteristic values $\vec{V}$ representative of movement of said terminal in the air, using the at least one sensor;

calculation of an instantaneous power value ($P(t_n)$) of said vector ($\overset{u}{V}(t_n)$) at the current instant where the instantaneous power value is a single value calculated as a function of the values of all of the inertial characteristics in the vector ($\overset{u}{V}(t_n)$);

estimation of a gesture indicator ($I(t_n)$) on the basis of a variation between said instantaneous power value and a mean power value estimated over a time window ($F[t_0,t_n]$) preceding the current instant;

determination of a first instant ($t_{n1}$), termed start of gesture, corresponding to the current instant, further to the estimated gesture indicator taking a value greater than or equal to a first predetermined threshold during a time interval greater than or equal to a first predetermined interval; and subsequent to the detection of a start of gesture at the first current instant ($t_{n1}$), determination of a second instant ($t_{n2}$), termed end of gesture further to, at the current instant, the estimated gesture indicator taking a value less than or equal to a second predetermined threshold during a time interval greater than or equal to a second predetermined time interval.

\* \* \* \* \*